United States Patent
Gluf, Jr. et al.

[11] Patent Number: 6,098,741
[45] Date of Patent: Aug. 8, 2000

[54] CONTROLLED TORQUE STEERING SYSTEM AND METHOD

[75] Inventors: Carl G. Gluf, Jr., Rochester; Edward J. Frank, Waterford; Irvin B. Rea, Royal Oak, all of Mich.

[73] Assignee: Eaton Corporation, Cleveland, Ohio

[21] Appl. No.: 09/238,807

[22] Filed: Jan. 28, 1999

[51] Int. Cl.$^7$ .................................................. B62D 5/06
[52] U.S. Cl. ............................................................. 180/421
[58] Field of Search .............................. 180/421, 422, 180/423

[56] References Cited

U.S. PATENT DOCUMENTS

| | | | |
|---|---|---|---|
| 4,471,811 | 9/1984 | Kawabata et al. | 137/625.38 |
| 4,629,025 | 12/1986 | Brasier et al. | 180/142 |
| 4,643,227 | 2/1987 | Suzuki et al. | 137/625.38 |
| 4,666,014 | 5/1987 | Carlson et al. | 180/148 |
| 4,702,335 | 10/1987 | Cage et al. | 180/423 |
| 4,751,978 | 6/1988 | Drutchas et al. | 180/142 |
| 4,828,065 | 5/1989 | Ishihara et al. | 180/142 |
| 4,877,099 | 10/1989 | Duffy | 180/142 |
| 4,896,544 | 1/1990 | Garshelis | 73/862.36 |
| 4,922,427 | 5/1990 | Yokote et al. | 364/424.05 |
| 4,947,893 | 8/1990 | Miller et al. | 137/625.65 |
| 4,992,944 | 2/1991 | Noto et al. | 364/424.05 |
| 5,029,660 | 7/1991 | Raad et al. | 180/422 |
| 5,067,576 | 11/1991 | Bober | 180/79.1 |
| 5,123,279 | 6/1992 | Henein et al. | 73/118.1 |
| 5,133,424 | 7/1992 | Fox et al. | 180/132 |
| 5,207,780 | 5/1993 | Norimatsu et al. | 180/141 |
| 5,261,637 | 11/1993 | Curnow | 251/129.15 |
| 5,307,892 | 5/1994 | Phillips | 180/79.1 |
| 5,351,555 | 10/1994 | Garshelis | 73/862.335 |
| 5,488,555 | 1/1996 | Asgari et al. | 364/424.05 |
| 5,513,673 | 5/1996 | Slavin et al. | 137/625.65 |
| 5,513,832 | 5/1996 | Becker et al. | 251/129.18 |
| 5,623,409 | 4/1997 | Miller | 364/424.051 |
| 5,641,033 | 6/1997 | Langkamp | 180/422 |
| 5,725,023 | 3/1998 | Padula | 137/596.17 |
| 5,761,627 | 6/1998 | Seidel et al. | 701/41 |
| 5,967,253 | 10/1999 | Raad et al. | 180/422 |

FOREIGN PATENT DOCUMENTS

| | | | |
|---|---|---|---|
| 0 686 541 A1 | 6/1995 | European Pat. Off. | B62D 6/00 |
| 686541 | 12/1995 | European Pat. Off. | |
| 07047970 | 6/1994 | Japan | B62D 6/00 |

*Primary Examiner*—Richard M. Camby
*Assistant Examiner*—Michael Britton
*Attorney, Agent, or Firm*—Daniel S. Kalka; Roger A. Johnston

[57] ABSTRACT

A controlled torque steering system 10 for use in an on demand hydraulic assist steering system for a vehicle allows a user to engage a controller 18 for employing a signal processor 16 to delay or ramp down a control output signal for providing a stable controlled torque steering system. Controlled torque steering system 10 allows for the selection of a determined amount of desired assist in steering, including none if so desired.

20 Claims, 5 Drawing Sheets

CONTROLLED TORQUE STEERING SYSTEM AND METHOD

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

1. Field of the Invention

The present invention relates in general to a vehicle steering system, and more specifically to a controlled torque steering system for an on demand hydraulic assist steering system.

2. Description of the Related Art

There is a wide variety of steering systems employed on vehicles. The first steering systems used on vehicles were the manual steering systems. Some of these type systems employed a Gemmer worm-and-roller gear, and/or a recirculating ball gear. Manual steering systems have been used on many automobiles well into the 1970's.

Conventional rack and pinion power steering systems (non-variable assist) are still widely used today. These are primarily hydraulic systems that may include a recirculating ball gear with a rack and pinion.

More recently, variable assist power steering systems have been developed and implemented as early as 1988. This design is an improvement over conventional power steering systems and provides the advantages of better road feel and increased fuel economy. The variable assist power steering system uses an electronic variable orifice (EVO) actuator or system, a controller, and a hand or steering wheel speed sensor. Vehicle speed is inputted into the EVO system controller so that as vehicle speed changes so does the steering assist to provide a more controlled driving experience.

It is known that an on demand hydraulic steering system uses less horsepower than conventional power steering.

These recent power steering systems have included speed sensitive steering which increase the manual steering forces or the driver feel at high vehicular speeds by reducing hydraulic fluid flow through control valves in order to reduce valve gain. Examples of such variable assist power steering systems are described in U.S. Pat. No. 5,133,424 entitled "Variable Assist Power Steering Control Valve" which issued on Jul. 28, 1992, and U.S. Pat. No. 4,877,099 entitled "Electronically Controlled Variable Assist Power Steering System" which issued on Oct. 31, 1989, of which both patents are incorporated by reference herein.

In an on demand hydraulic assist steering system, typically the system includes a hydraulic power cylinder coupled to the linkage mechanism, and a pump or source of pressurized hydraulic fluid. A valving mechanism directs the hydraulic fluid from the pump to the power cylinder in relation to the magnitude and direction of steering torque applied to the steering wheel. In this manner, there is hydraulically generated a steering assist force on the linkage mechanism which aids the operator of the vehicle.

At low vehicle speeds, a relatively high level of steering assist is likely to be required and the hydraulic flow is maintained at a relatively high level under such conditions to provide this capability. At high vehicle speeds, a relatively low level of steering assist is likely to be required and the hydraulic flow is reduced. Potentially, this can effect an energy savings and can improve the on-center stability of the vehicle. U.S. Pat. No. 5,725,023 describes an electronically variable pressure power steering system with control valve and sensor. This patent is hereby incorporated by reference.

Other variable assist power steering systems are described in the following patents: U.S. Pat. No. 5,307,892 entitled "Electronically Controlled Power Steering System"; U.S. Pat. No. 5,207,780 entitled "Hydraulic Valve Device for Automotive Power Steering Gear"; U.S. Pat. No. 4,828,065 entitled "Electronically Controlled Power Steering System"; U.S. Pat. No. 4,471,811 entitled "Linear Solenoid-Operated Valve for Use in Power Steering System"; U.S. Pat. No. 4,643,227 entitled "Linear Solenoid-Operated Valve for Use in Power Steering System"; and U.S. Pat. No. 4,629,025 entitled "Flow Regulated Power Assist Steering System with Evasive Maneuver Capability". Other patents related to this disclosure include: U.S. Pat. No. 5,513,832 entitled "Variable Force Solenoid Valve"; U.S. Pat. No. 5,513,673 entitled "Electrically Modulated Pressure Regulator Valve with Variable Force Solenoid"; U.S. Pat. No. 5,261,637 entitled "Electrical Variable Orifice Actuator"; and U.S. Pat. No. 4,947,893 entitled "Variable Force Solenoid Pressure Regulator for Electronic Transmission Controller". These patents are all hereby incorporated herein by reference.

When a torque sensor located in the steering wheel shaft outputs a torque signal, the electronic controller ordinarily outputs a command signal to the electronically variable orifice system (EVO) which results in more flow to the steering gear. However, when the torque demand decreases or is less, an oscillation can occur which is caused by unstable electronics and/or hydraulics.

Thus, there still exists a need for a system that addresses the problems with such oscillations to provide a more stable, better controlled steering system. Preferably, such a system would delay or ramp down the output signal to the electronically variable orifice or to a slower rate. Advantageously, such a system would include a selecting means for operator or user interface that would include a user actuatable switch with means for selecting a desired amount of assist when activated. In the inactive state, the selecting means would automatically default to the manufacturer's variable assist power steering system.

BRIEF SUMMARY OF THE INVENTION

The present invention is directed to solving the aforementioned problems as well as others by providing a controlled torque steering system for an on demand hydraulic assist steering system that delays or ramps down the output signal for the electronically variable orifice system. The present invention alleviates the oscillations caused with fluctuations in torque demand which are believed to be caused by unstable electronics, hydraulics, or the like.

An object of the present invention is to provide a controlled torque steering system that employs a controller in communication with and responsive to selecting means for selecting a predetermined amount of desired assist in steering. The controller receives a torque signal from a torque sensor, and processes the torque signal to generate a controller output signal that is delayed or ramped down at a set rate to means for varying flow of hydraulic fluid to a steering unit when activated.

Another object of the present invention is to provide a controlled torque steering system that employs user actuatable means for selecting a predetermined amount of desired assist in steering.

A further object of the present invention is to provide a controlled torque steering system that includes an automated means for selecting a determined amount of desired assist in steering.

Still a further object of the present invention is to provide a controlled torque steering system for a vehicle which includes means for delaying and/or ramping response time of the control output signal for providing the control output signal to an electronic variable orifice at a preset rate.

Still a further object of the present invention is to provide a method for controlling steering with an on demand hydraulic assist steering system which comprises the steps of selecting a predetermined amount of desired assist in steering, sensing torque in a steering wheel shaft with a torque sensor and establishing a signal indicative thereof, receiving the torque signal with a controller in communication with the torque sensor, generating a control output signal at a preset rate with the controller when activated, and varying the flow of hydraulic fluid to a steering unit responsive to the control output signal.

Still a further object of the present invention is to provide a method for controlling steering with an on demand hydraulic assist steering system that allows user actuatable means to select a predetermined amount of desired assist in steering.

Still a further object of the present invention is to provide a method for controlling steering with an on demand hydraulic assist steering system that employs automated means for determining the amount of desired assist in steering.

The various features of novelty which characterize the invention are pointed out with particularity in the claims annexed to and forming a part of this disclosure. For a better understanding of the invention, it operating advantages and specific objects attained by its uses, reference is made to the accompanying drawings and descriptive matter in which a preferred embodiment of the invention is illustrated.

DETAILED DESCRIPTION OF THE INVENTION

Figure 1:
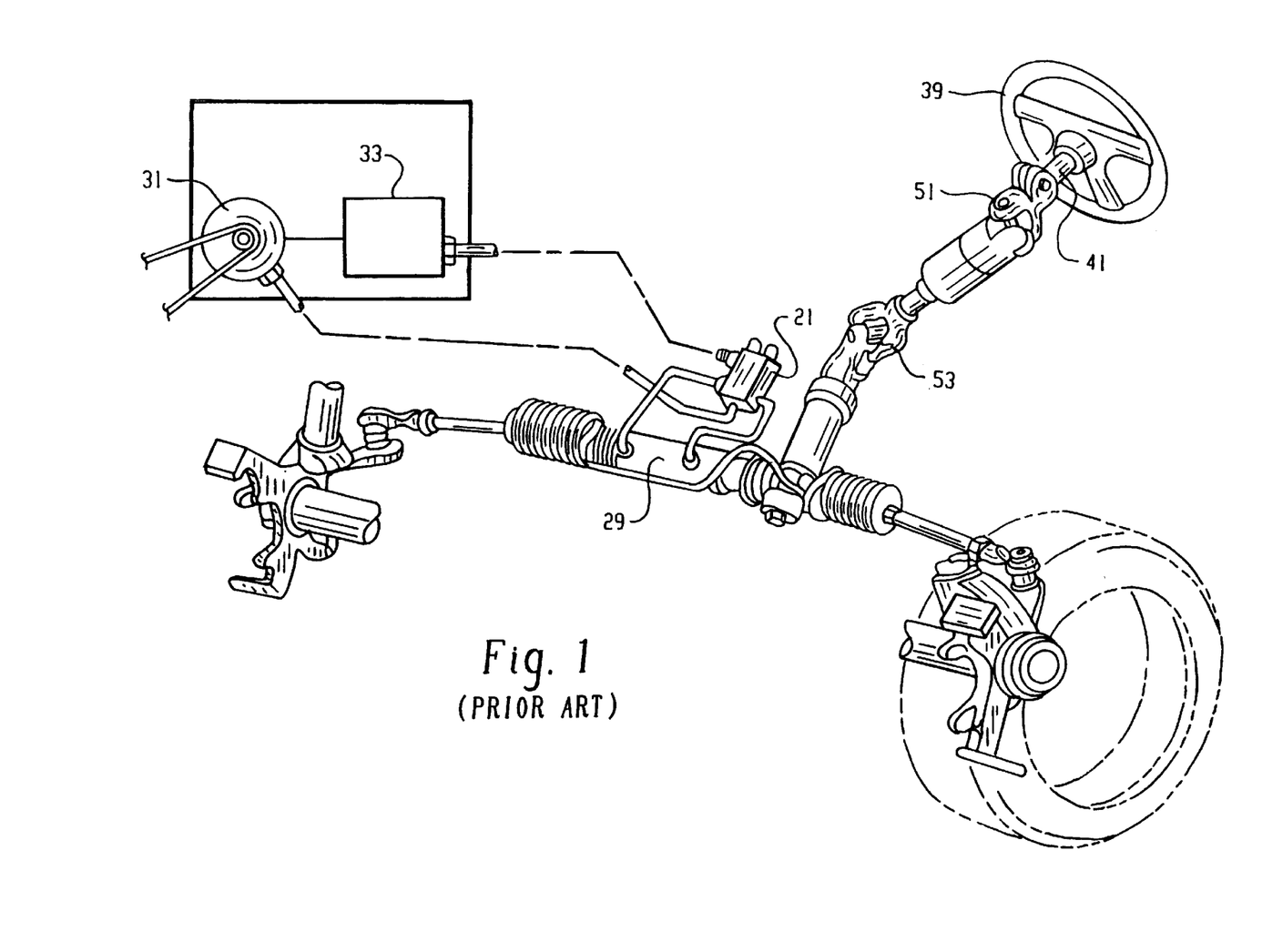
FIG. 1 is a perspective view, partially in diagrammatic form, showing a known variable assist power steering system.

Referring to the figures, where like numerals designate like or similar features throughout the several views, and first in particular to FIG. 1, there is shown a known variable assist power steering system. The power steering system includes a control valve 21, a non-compliant pinion shaft 23, a pinion gear 25, a rack 27, a steering cylinder 29, a steering pump 31, a steering fluid reservoir 33, a sensor 35, an electrical control unit 37, and an operator accessible steering wheel 39. Steering wheel 39 has a steering shaft 41 fastened thereto coupled to pinion shaft 23 through a plurality of couplings 51, 53 and 55. Thus, when the operator or driver turns steering wheel 39, steering shaft 41, pinion shaft 23, and pinion gear 25 will rotate in concert therewith. Pinion gear 25 is enmeshed with a toothed segment of rack 27 such that rotational movement of pinion shaft 23 is translated into linear movement of rack 27 within steering cylinder 29. This rack and pinion assembly is of a conventional type employing an integral piston coupled for movement with rack 27. Valve 21 directs power steering fluid flow and controls the fluid pressure to reduce steering effort. The difference in steering fluid pressure on either side of the piston assists movement of rack 27, thereby selectively supplementing the manual forces applied through the mechanical interface between rack 27 and pinion gear 25 and reducing turning efforts. The fluid in the oppositely compressed portion of steering cylinder 29 is forced back into valve 21 and into reservoir 33. When the steering effort stops, control valve 21 causes pressure to be equalized on both side of the piston such that the front wheel returns to a straight ahead or neutral position.

While the controlled torque steering system of the present invention finds particular applicability to the previously described variable assist power steering system, it should be immediately apparent that the present invention may be employed in any on demand hydraulic assist steering system.

Figure 2:
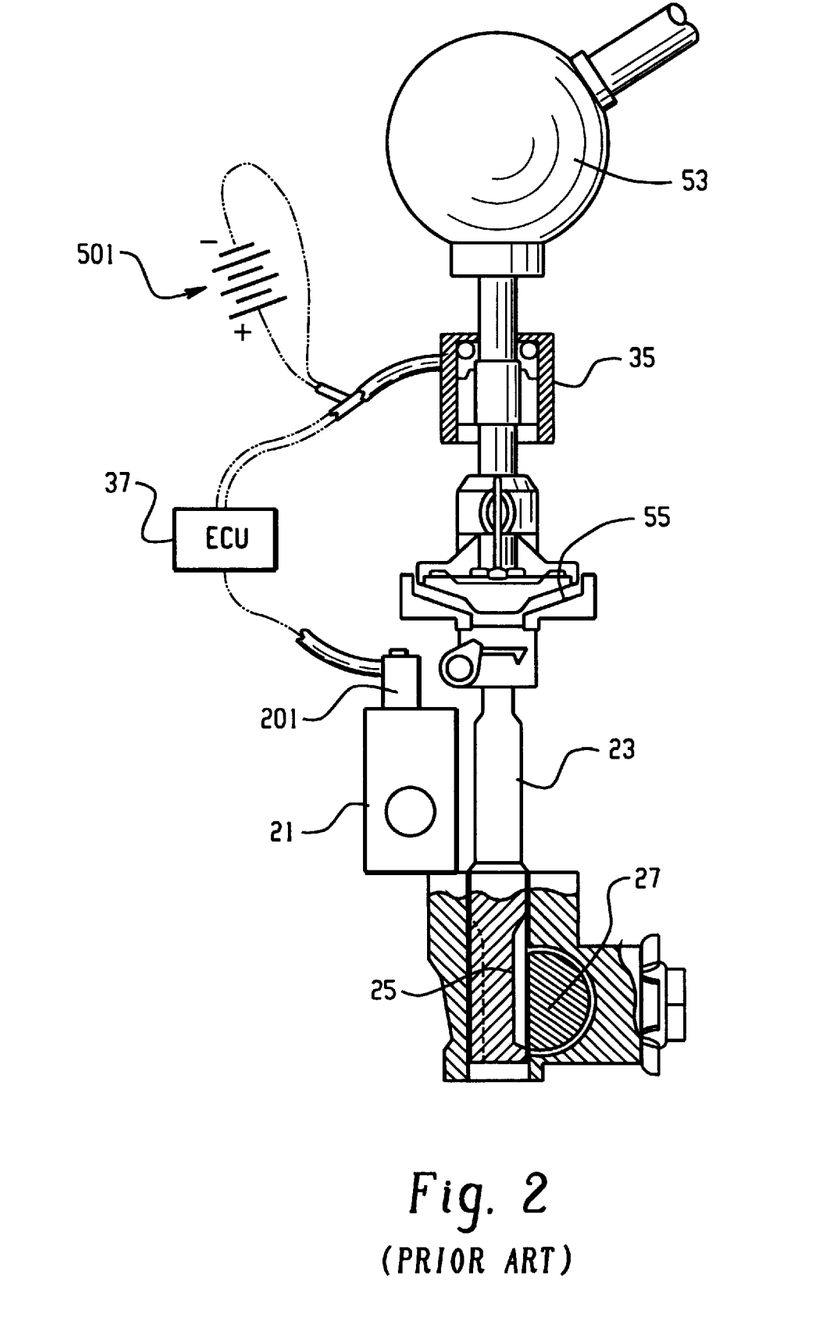
FIG. 2 is a side elevational view, partially in diagrammatic form showing the known variable assist power steering system with a known control valve.
Figure 3:
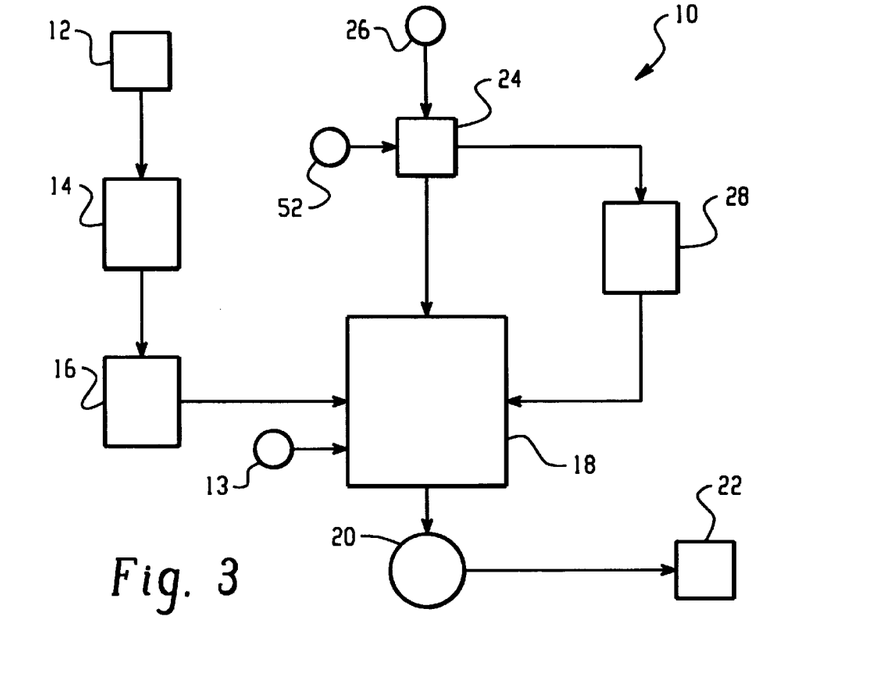
FIG. 3 is a block diagram schematic of the present invention.

The controlled torque steering system in accordance with the present invention is generally designated 10 as shown in FIG. 3. In FIG. 3, the controlled torque steering system 10 of the present invention employs a torque sensor 12 operatively connected to a steering wheel shaft and establishes a signal based on rotation thereof. Torque sensor 12 may be mounted in a manner similar to that of sensor 35 shown in FIG. 2. Torque sensor 12 is preferably a transducer of a magnoelastic variety as described in U.S. Pat. No. 5,351,555 entitled "Circularly Magnetized Non-Contact Torque Sensor and Method for Measuring Torque Using Same." It may be one described in U.S. Pat. No. 4,896,544 entitled "Magnefoelastic Torque Transducer"; U.S. Pat. No. 5,123,279 entitled "Transducer for an Electromotively Driven Power Steering System"; or the like. All of these transducer patents are hereby incorporated by reference. Referring back to FIG. 2, transducer 35 is electrically connected to a power supply 501 and has a second pair of leads connected for sending a signal to an electrical control unit.

Referring once again to FIG. 3, the torque signal is transmitted to a torque conditioner circuit 14 where it is processed into a high impedance output voltage output signal where it is further processed with signal processor 16. A controller 18, which may be similar in construction to electronic controller 37, in communication with the signal processor 16, the torque conditioner circuit 14 and the torque sensor 12 receives the processed torque signal, and generates a control output signal therefrom. While each of these devices is depicted as a separate unit in the block diagram of FIG. 3, it should be understood that the torque conditioner circuit 14 and the signal processor 16 can be integrated into controller 18. Controller 18 is preferably a microprocessor but may alternately be an analog or other similar device. The controller 18 can also optionally receive a vehicle velocity signal from a speed sensor 13 such as a permanent magnet speed sensor coupled to a vehicle drive shaft, or the like. Controller 18 employs various formulas in calculating a desired solenoid current as a function of velocity such as those disclosed in U.S. Pat. No. 4,629,025 which is incorporated by reference. The control output signal is applied or released at a preset rate when the controlled torque steering system 10 of the present invention is in an activated state as later herein described and sent to means for varying flow of hydraulic fluid 20 such as an electronically variable orifice system. A suitable electronically variable orifice system 20 is described in U.S. Pat. No. 5,725,023 which has been incorporated by reference. Hydraulic fluid from a reservoir similar to the one 33 described in FIG. 1 is then supplied to the steering unit 22 in a known manner. Steering unit 22 is well known to those skilled in this art and a representative steering unit is shown in FIG. 1 and further described in U.S. Pat. No. 5,725,023. Of course, the controlled torque steering system 10 of the present invention may be employed in any on demand hydraulic steering system.

The controlled torque steering system 10 includes selecting means 24 which selects a predetermined amount of desired assist in steering. Selecting means 24 may be user actuatable as depicted with the switch 26, or other engagement means. Alternatively, selecting means 24 may include an automated means 28 for determining the desired assist in steering, for example, based on vehicle speed from vehicle speed sensor 13. User actuatable means 26 in the preferred embodiment includes user input means 52 such as a selectable switch that allows selection of the maximum or minimum amount of assist desired.

Figure 4:
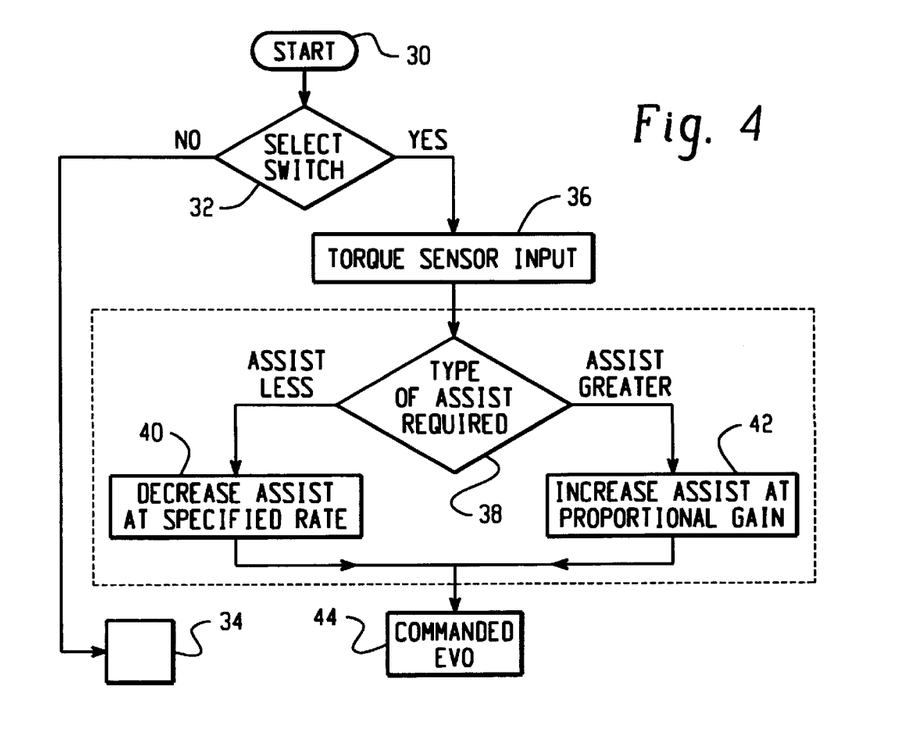
FIG. 4 is a logic flow diagram of the controlled torque steering system in accordance with the present invention.

Referring next to FIG. 4, there is illustrated by way of a logic flow chart the controller strategy of the present invention. Initially, from the start position 30 an operator of a vehicle has the ability through selecting means 24 as shown by decision block 32 to decide whether to engage the controlled torque steering system 10 into an activated position or state, or to allow the vehicle manufacture's variable assist power steering be active. The operator may simply choose to use the on demand hydraulic assist steering system provided by the original equipment manufacturer (OEM). The selecting means 24 may even include the option to disengage the variable assist steering supplied by the OEM. This would provide a steering system similar to that of a conventional power steering system. In FIG. 2, this decision is depicted by the line labeled NO which is connected to the on demand hydraulic assist steering system found on the vehicle depicted as instruction block 34. If the operator of the vehicle decides to engage the controlled torque steering system 10, then the line labeled YES illustrates the remaining logic steps of the control strategy. Instruction block 36 labeled torque sensor input is provided to decision block 38. If the user actuatable means 26 is selected, then in the preferred embodiment the user input means 52 allows the operator to specify the type of assist required in decision block 38. For example, if less assist is desired, the selecting means 24 allows the user to select the line labeled Assist Less as shown in FIG. 4. As a result, instruction block 40 instructs system 10 to decrease the assist at a specified rate which may be programmed based on predetermined calculations into controller 18. On the other hand, the operator of the vehicle may choose to request greater assist as shown by the line labeled Assist Greater which will instruct instruction block 42 to increase the assist at a proportional gain or specified rate based on programmed instructions, or even vehicle speed or torque. Instruction block 44 represents the flow varying means 20 receiving the signals and preferably includes an electronically variable orifice system such as the one described with reference back to FIGS. 1 and 2.

Figure 5:
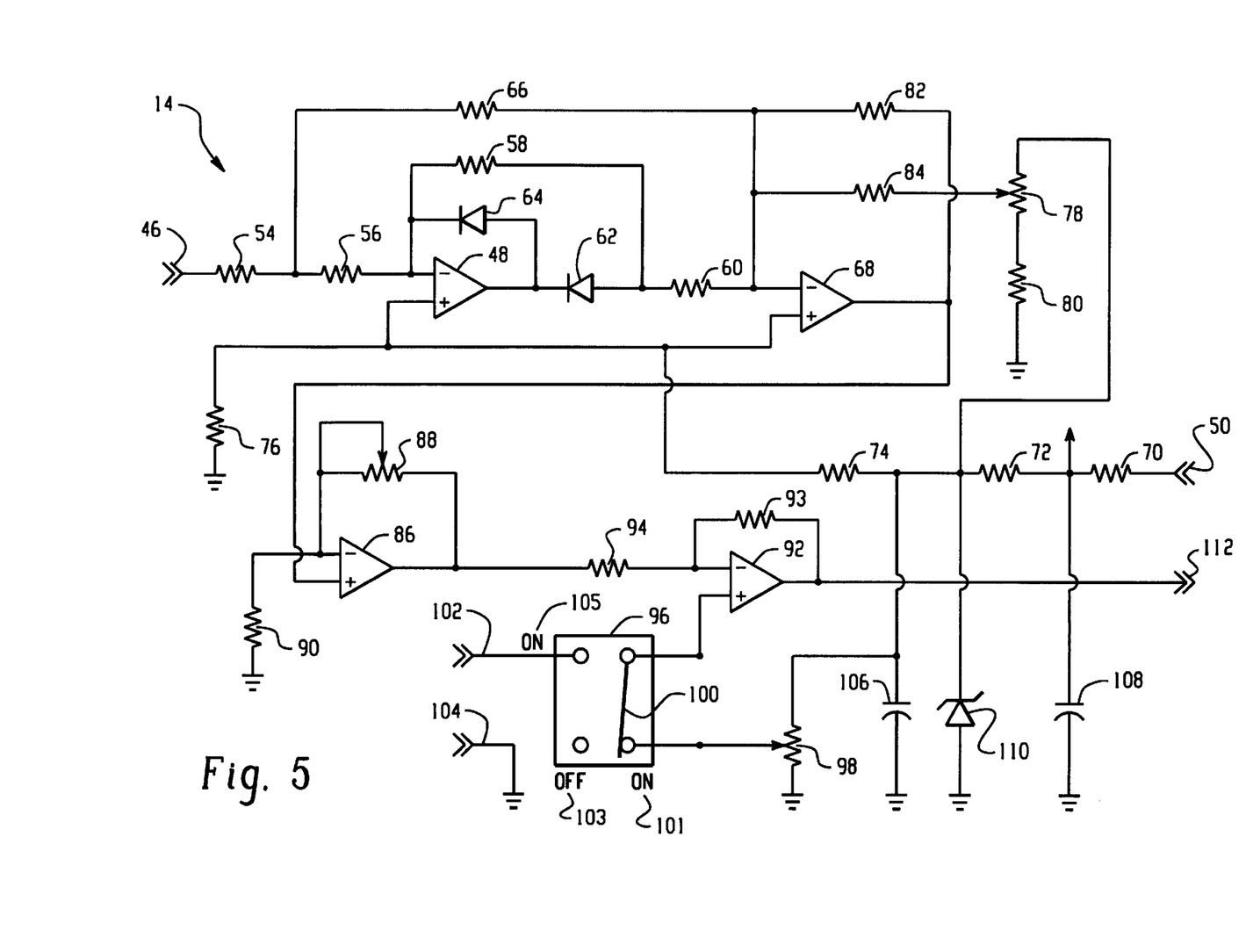
FIG. 5 is a known torque conditioner circuit employed in the steering system of the present invention.

Torque sensor 12 provides a torque signal which preferably is approximately a 0–5 volt (V) signal to the torque conditioner circuit 14 shown in FIG. 5. The torque sensor signal is provided as a voltage input signal 46. The torque signal is preferably indicative of the position of the steering wheel. For example, an approximate 2.5 Volt signal is indicative that no torque is being applied to the steering wheel. That is the steering wheel is positioned so that the wheels are substantially straight. As the steering wheel is turned to the right, the voltage swings positive or negative depending on the direction of movement of the wheel as is known in this art. The torque conditioner circuit 14 which is known in this art takes the 0–5 Volt signal and provides a high impedance output voltage signal. While the torque conditioner circuit 14 as represented in FIG. 3 is shown situated outside controller 18, it should be readily understood that torque conditioner circuit 14 may be incorporated within the controller. The torque sensor signal 46 is first sent to operational amplifier 48. Operational amplifier 48 is preferably a LM2902 operational amplifier commercially available from National Semiconductor Corporation. The inverting input (–) of operational amplifier 48 receives the torque sensor signal. Operational amplifier 48 and associated circuitry provides an absolute value detection. The output voltage of operational amplifier 48 is always positive, and as such is what is termed or known as an absolute value detector. A fixed voltage value of approximately 2.5 Volts is provided to the non-inverting input (+) of operational amplifier 48. When there is zero torque, which means the steering wheel is not being moved, there is no difference in the output voltage of operational amplifier 48. Resistors 54, 56, and 58 are operatively connected as shown in the circuit arrangement. In the preferred embodiment, resistors 54, 56, 58, and 60 are 100 K ohm resistors. Small signal diodes 62, 64 are operatively connected to always provide a positive output voltage. A suitable diode is a 1N4148 diode available from National Semiconductor Corporation. Resistor 66 which is preferably in this example a 200 K ohm resistor is also operatively connected therein. It should be immediately apparent that other resistance values may be employed and the ones provided are for illustrative purposes of the preferred embodiment.

Operational amplifier 68 receives the output voltage at its inverting pin. The non-inverting pin of operational amplifier 68 also has a fixed voltage applied thereto similar to the non-inverting pin of operational amplifier 48. The fixed voltage is provided by the battery at line input 50, preferably the battery is the vehicle battery. The fixed voltage line includes resistors 70, 72, 74 connected in series. The fixed voltage applied to the non-inverting pin of operational amplifiers 48, 68 is connected in a line that is grounded through resistor 76 and includes Zener diode 110 to establish a reference voltage of preferably approximately 5V. Resistors 74 and 76 act to divide that reference voltage in approximately one half for amplifiers 48, 68. A reference voltage of preferably 5V is also applied to the torque sensor as is known. Operational amplifier 68 amplifies the output and provides an adjustable threshold value with its operative connection to potentiometer 78. Potentiometer 78 is connected to ground through resistor 80. A negative feedback resistor 82 is positioned within the circuit. Resistor 84 is operatively connected to potentiometer 78 and the amplifier 68. It adds to the offset for adjusting the threshold value. The threshold adjustment of potentiometer 78 may be adjusted automatically or manually to depend on speed or some other selectable parameter. Accordingly, it may be shifted up or down dynamically and may be responsive to the field of the steering wheel or any other desired parameter. Resistors 74 and 76 are preferably 47 K ohm resistors. Resistor 72 is a 470 ohm resistor and resistor 70 is a 100 ohm resistor. Resistor 80 is a 20 K ohm resistor, resistor 84 is a 300 K ohm resistor, and resistor 82 is a 1M ohm resistor. The resistor in potentiometer 78 has a resistance value of 10 K ohms.

In the next stage of the circuit, operational amplifier 86 receives the signal at its non-inverting pin and is employed to amplify the stage and provide a gain setting adjustment. Operational amplifier 86 sets the gain and is adjustable with potentiometer 88 which is operatively connected and grounded through resistor 90 to the inverting pin of operational amplifier 86.

Resistor 90 has a resistance of preferably 100 K ohms and potentiometer 88 has a resistance value of 1M ohms. Operational amplifier 92 receives the gain adjusted signal from operational amplifier 86 through resistor 94. Operational amplifier 92 receives the signal on the inverting pin thereof and determines the maximum level attained with the circuit. Operational amplifier 92 at its non-inverting pin is preferably connected to a switch 96 that in one position simulates a determined signal such as a speed signal with the employment of potentiometer 98. Switch 96 is preferably a user actuatable switch, or may be automated. Switch 96 preferably includes a toggle 100 that may be switched in one position as indicated as ON at 101 to activate the controlled torque steering system in accordance with the present invention, or alternatively in its OFF position at 103 to disable the variable assist system, or to still another position 105 to use the actual speed input signal which is an analog input to make steering adjustments based thereon. The analog speed input signal is provided on line 102 to switch 96. The signal 102 is grounded via line 104. Potentiometer 98 allows for adjustment with a simulated speed signal, or other parameter. Switch 96 allows the variable assist steering system to be disengaged at position 103 or merely employ the actual speed input. Capacitors 106, 108 are filtering capacitors that facilitate in reducing or eliminating electrical noise to provide a cleaner direct current (DC). The torque conditioner circuit 14 shown in FIG. 5 provides a relatively high impedance output voltage output signal that preferably ranges from 0–5 Volts at output 112.

In the preferred embodiment, resistors 94 and 93 have a resistance of 100 K ohms. Potentiometer 98 has a resistance of 100 K ohms. While switch 96 is shown as a user actuatable switch, it should be immediately apparent that switch 96 may be programmed or controlled via a microprocessor such as controller 18 or other suitable means so that it is automated and based on either set parameters or user interaction. Also, the values of resistance set forth herein are for the preferred embodiment and other embodiments can include other values of resistance.

Figure 6:
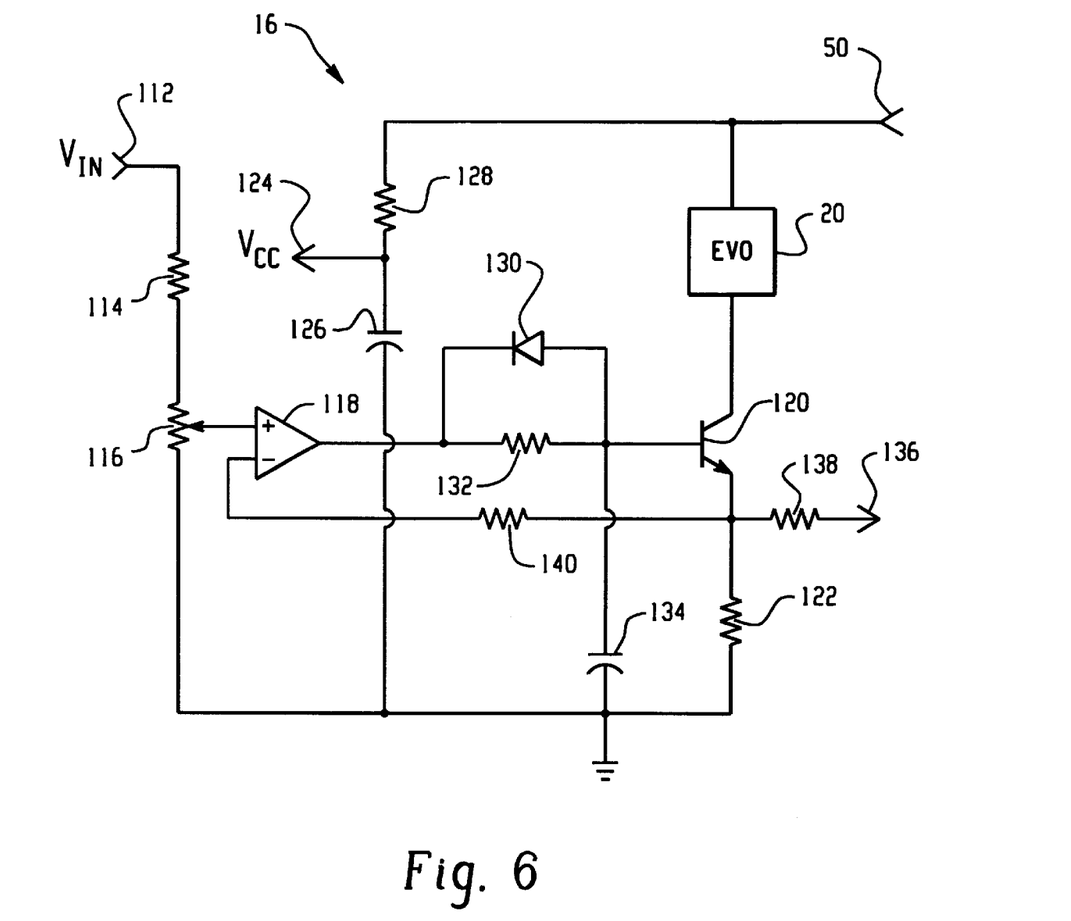
FIG. 6 is a voltage input to output current converter for delaying and/or ramping down the control output signal in accordance with the present invention.

Turning next to FIG. 6, there is shown a schematic of a suitable circuit 16 that processes the torque signal as conditioned by the circuit 14 shown in FIG. 5, and with the use of controller 18 generates a control output signal at a preset rate when the controlled torque steering system is activated. The relatively high impedance output voltage signal 112 is connected through resistor 114 where a portion of the signal is tapped off by potentiometer 116 and is provided as an input to the non-inverting pin of operational amplifier 118. The output from operational amplifier 118 feeds directly into the base of a transistor 120 such as preferably a Darlington transistor, TIP 11 commercially available from National Semiconductor Corporation. The emitter of transistor 120 sends a signal that passes through 1 Watt–1 ohm resistor 122 which is grounded as indicated. An output current of the load from the hydraulic fluid flow varying means such as an EVO 20 is sent to the inverting input of operational amplifier 118 and compared with the torque output voltage signal by operational amplifier 118. The output of transistor 120 is provided to the EVO 20 as current which is directly proportional to the input signal in voltage. In electronic variable orifice 20, the load may include a control solenoid, which may be similar in construction to that of solenoid 201 as shown in FIG. 2 and described in U.S. Pat. No. 5,725,023, for the electrically variable orifice for regulating flow of hydraulic fluid. The voltage input to output current converter shown in FIG. 6 is powered through the vehicle battery 50 and the circuitry includes a power source supply 124 for powering the operational amplifier 118. The filtering capacitor 126 is provided to eliminate line noise. Resistor 128 is operatively connected therein. The diode 130, resistor 132, and capacitor 134 provide the delay or establish the ramp and is adjustable with the time constant capacitor 134. This is the biasing portion of this circuit. The signal processor 16 delays application of the control output signal in one direction preferably with the bias portion. The signal processor 16 may either delay the application of the control output signal or simply the release of the control output signal. Delaying the application is preferred. The load current applied to the solenoid may be monitored at 136 with suitable means or a gauge like a volt meter. Resistor 138 isolates the meter from the circuit.

It should be understood that any suitable signal processor that functions as a voltage input to output current converter may be used in the present invention. This signal processing provides a more stable controlled torque steering system.

In the preferred embodiment, resistor 114 is a 39 K ohm resistor. Resistors 132, 140, and 138 are 1 K ohm resistors. Diode 130 is a 1N4148 small signal diode available from National Semiconductor Corporation. Resistor 128 is a 470 ohm resistor. Potentiometer 116 has a resistance value of 10 K ohms. Again, these values are being provided to illustrate a preferred embodiment. The present invention is not intended to be limited thereto. An alternate embodiment would include employment of fixed resistance once potentiometer values have been determined or set. Other suitable signal processing means may be employed to achieve the objects set forth herein.

The present invention is particularly suited for an on demand hydraulic steering system and is an improvement over the electronically variable orifice power steering systems that are currently commercially available. The advantages over other non-torque controlled steering systems include fuel savings, better overall feel of steering, reduced side-to-side vehicle variability, and eliminates the requirement for a hand or steering wheel speed sensor.

The operation of the controlled torque steering system of the present invention is relatively straightforward. When the operator is driving straight, the hydraulic fluid flow rate is at a minimum. As the operator begins a turn, the steering system detects a torque increase, and compensates by increasing the flow rate. During the turn, the system immediately reaches an equilibrium period as the driver finishes the turn, the system detects the torque decrease, and begins to decrease the flow rate. While driving straight, the flow rate returns to a minimum.

The controlled torque steering system of the present invention reduces oscillation presumably caused by unstable electronics and/or hydraulics by providing a delay or ramping down of the command control output signal at a slower rate. Conversely, if the operator desires the feel of conventional power steering, this may be accomplished by using the selecting means 24 to disable the controlled torque steering system, and possibly even the electronic variable orifice system. Alternatively, selecting means 24 may be employed to provide for the use of vehicle speed input to signal the steering controller to command a different strategy. User actuatable means 26 allows the operator to select the stable controlled torque steering system and further in conjunction with user input means 52 allows the operator to control how much assist.

While a specific embodiment of the invention has been shown and described in detail to illustrate the application of the principles of the present invention, it will be understood that the invention may be embodied otherwise without departing from such principles.

We claim:

1. In an on demand hydraulic assist steering system, a controlled torque steering system (10) comprising:

means for selecting (24) a predetermined amount of desired assist in steering;

a torque sensor (12) for sensing a torque of a steering wheel shaft and establishing a signal indicative thereof;

a controller (18) in communication with and responsive to said selecting means (24) and said torque sensor (12) for receiving the torque signal therefrom, said controller having means for processing the torque signal (14, 16) to generate a control output signal, said processing means (14, 16) of said controller including means for delaying (16) response time of the control output signal for providing the control output signal at a preset rate; and means for varying flow (20) of hydraulic fluid to a steering unit (22), said flow varying means (20) being in communication with said controller (18) and responsive to the output signal therefrom.

2. A controlled torque steering system as recited in claim 1, wherein said selecting means comprises user actuatable means (26) for selecting a predetermined amount of desired assist in steering.

3. A controlled torque steering system as recited in claim 2, wherein said user actuatable means comprises a switch.

4. A controlled torque steering system as recited in claim 1, wherein said selecting means (24) comprises automated means (28) for determining an amount of desired assist in steering based on vehicle speed.

5. A controlled torque steering system as recited in claim 1, wherein said delaying means (16) comprises a voltage input to output current converter.

6. A controlled torque steering system as recited in claim 1, further comprising user input means (52) for selecting a desired amount of assist.

7. A steering controller system as recited in claim 1, wherein said means for varying flow (20) of hydraulic fluid comprises an electronic variable orifice.

8. A method for controlling steering with an on demand hydraulic assist steering system, comprising the steps of:

selecting (20) a predetermined amount of desired assist in steering; sensing torque in a steering wheel shaft with a torque sensor (12) and establishing a signal indicative thereof;

receiving the torque signal with a controller (18) in communication with the torque sensor (12);

generating a control output signal, said generating step including the step of delaying (16) the control output signal; and varying flow of hydraulic fluid (20) to a steering unit (22) responsive to the control output signal with means for varying hydraulic fluid flow (20).

9. A method as recited in claim 8, wherein said selecting step further comprises the step of providing user actuatable means (26) for selecting a predetermined amount of desired assist in steering.

10. A method as recited in claim 8, wherein said selecting step further comprises the step of providing automated means (28) for determining an amount of desired assist in steering.

11. A method as recited in claim 10, wherein said step of providing automated means (28) further comprises the steps of inputting a vehicle speed signal (102) to the controller (18), and determining an amount of assist in steering responsive thereto.

12. A method as recited in claim 8, wherein said delaying step comprises the step of delaying application of the control output signal.

13. A method as recited in claim 8, wherein said delaying step comprises the step of delaying release of the control output signal.

14. A method as recited in claim 8, further comprising the steps of providing a user actuatable input means (26) and inputting an amount of assist in steering.

15. A method as recited in claim 14, wherein said inputting step comprises the step of providing incremental amounts of assist in steering.

16. A method as recited in claim 14, wherein said inputting step comprises the step of providing decremental amounts of assist in steering.

17. In an electronic controller for an electronic variable orifice steering system, the improvement comprising a signal processor (16) for delaying a control output signal generated by the controller for transmission to means for varying flow in the variable orifice steering system.

18. The electronic controller as recited in claim 17, wherein said signal processor 16 delays application of the control output signal in one direction only to a solenoid.

19. The electronic controller as recited in claim 17, wherein said signal processor 16 delays release of the control output signal in one direction only to a solenoid.

20. A method as recited in claim 8, wherein said delaying step comprises the step of ramping down the control output signal.

* * * * *